US012529946B2

(12) United States Patent
Lu et al.

(10) Patent No.: US 12,529,946 B2
(45) Date of Patent: Jan. 20, 2026

(54) WATERPROOF PROJECTOR

(71) Applicant: Shanghai SHYLON Optoelectronic Technology Co., Ltd, Shanghai (CN)

(72) Inventors: Yinghui Lu, Shanghai (CN); Liang Wei, Shanghai (CN)

(73) Assignee: SHANGHAI SHYLON OPTOELECTRONIC TECHNOLOGY CO., LTD, Shanghai (CN)

( * ) Notice: Subject to any disclaimer, the term of this patent is extended or adjusted under 35 U.S.C. 154(b) by 561 days.

(21) Appl. No.: 17/971,906

(22) Filed: Oct. 24, 2022

(65) Prior Publication Data

US 2023/0133774 A1     May 4, 2023

(30) Foreign Application Priority Data

Nov. 1, 2021    (CN) .......................... 202111281224.0

(51) Int. Cl.
*G03B 21/14*     (2006.01)
*G03B 21/16*     (2006.01)

(52) U.S. Cl.
CPC ........... *G03B 21/145* (2013.01); *G03B 21/16* (2013.01)

(58) Field of Classification Search
CPC .............................. G03B 21/145; G03B 21/16
See application file for complete search history.

(56) References Cited

U.S. PATENT DOCUMENTS

| | | | | |
|---|---|---|---|---|
| 2014/0293239 | A1* | 10/2014 | Shimizu | G03B 21/2046 |
| | | | | 353/52 |
| 2016/0033122 | A1* | 2/2016 | Sakigawa | F21V 29/54 |
| | | | | 445/44 |
| 2020/0241401 | A1* | 7/2020 | Sano | F04D 13/12 |
| 2021/0131659 | A1* | 5/2021 | Ishida | G03B 21/2013 |

FOREIGN PATENT DOCUMENTS

| | | | | |
|---|---|---|---|---|
| CN | 108519720 | A | * 9/2018 | ............. G03B 21/16 |
| CN | 108662499 | A | * 10/2018 | ................ F21S 8/00 |
| CN | 207965452 | U | * 10/2018 | ........... G03B 21/145 |
| CN | 208255608 | U | * 12/2018 | |
| CN | 208444124 | U | * 1/2019 | |
| CN | 208546809 | U | * 2/2019 | ................ F21S 8/00 |
| CN | 110082991 | A | * 8/2019 | ........... G03B 21/145 |
| CN | 212255995 | U | * 12/2020 | |
| CN | 212749507 | U | * 3/2021 | |
| CN | 116360191 | A | * 6/2023 | |
| KR | 102784029 | B1 | * 11/2021 | |
| KR | 20230077412 | A | * 11/2021 | |

* cited by examiner

*Primary Examiner* — Bao-Luan Q Le
(74) *Attorney, Agent, or Firm* — Maschoff Brennan

(57) ABSTRACT

Provided is a waterproof projector. The projector comprises an upper cover, an upper housing, a cavity shell and a lower cover, the upper cover is arranged at the upper end of the cavity shell, a first sealing structure is arranged between the upper cover and the upper end of the cavity shell, the lower cover is arranged at the lower end of the cavity shell, a second sealing structure is arranged between the lower cover and the lower end of the cavity shell, a main body structure is arranged in the cavity shell, an access hole is formed in the cavity shell, an access shell is arranged at the access hole, a third sealing structure is arranged between the access shell and the cavity shell, a heat dissipation structure is arranged on the upper cover, the upper housing is arranged on the outer side of the heat dissipation structure.

8 Claims, 6 Drawing Sheets

WATERPROOF PROJECTOR

CROSS-REFERENCE TO RELATED APPLICATION

This patent application claims the benefit of and priority to Chinese Patent Application No. 202111281224.0, filed with the China National Intellectual Property Administration on Nov. 1, 2021, the disclosure of which is incorporated by reference herein in its entirety as part of the present application.

TECHNICAL FIELD

The present disclosure relates to the technical field of outdoor projection, in particular to a waterproof projector.

BACKGROUND

As a novel device for outdoor illumination, the projector widely applied in the field of outdoor illumination is different from a traditional indoor projector. When working outdoors, the outdoor projector faces many problems. Especially, the influence of severe weather is a huge challenge for the projector, so that waterproof performance of the projection is particularly important.

SUMMARY

The present disclosure aims to provide a waterproof projector so as to solve the waterproof problem of the outdoor projector and greatly improve the working performance of the projector.

In order to achieve the purpose, the present disclosure provides the following scheme.

The present disclosure provides a waterproof projector, comprising an upper cover, an upper housing, a cavity shell and a lower cover, wherein the upper cover is arranged at the upper end of the cavity shell, a first sealing structure is arranged between the upper cover and the upper end of the cavity shell, the lower cover is arranged at the lower end of the cavity shell, a second sealing structure is arranged between the lower cover and the lower end of the cavity shell, a main body structure is arranged in the cavity shell, an access hole is formed in the cavity shell, an access shell is arranged at the access hole, a third sealing structure is arranged between the access shell and the cavity shell, a heat dissipation structure is arranged on the upper cover, the upper housing is arranged on the outer side of the heat dissipation structure and connected with the upper cover, and a heat dissipation pipe of the heat dissipation structure penetrates through the upper cover and extends into the cavity shell to dissipate heat of the main body structure.

Preferably, the upper housing comprises a top wall and a side wall, a plurality of heat dissipation holes are formed in the side wall, the upper end of the side wall is connected with the top wall, the lower end of the side wall is connected with the upper cover, and the size of the upper end of the side wall is smaller than that of the lower end of the side wall.

Preferably, the heat dissipation structure further comprises fans, water pumps and heat dissipation fins, the heat dissipation pipe is filled with a cooling medium, the water pumps are arranged on the heat dissipation pipes, the fans are arranged towards the heat dissipation fins, the heat dissipation pipes penetrate through the heat dissipation fins and the heat conduction structures of the main body structure, the heat dissipation pipes transfer heat of the heat conduction structures to the heat dissipation fins, and the fans blow air to the heat dissipation fins for heat dissipation of the heat dissipation fins.

Preferably, the fan is a waterproof fan.

Preferably, the upper cover is provided with quick-release connectors, the heat dissipation pipe is connected with the quick-release connector, and a fourth sealing structure is arranged between the upper cover and the quick-release connector.

Preferably, a keyboard plate is arranged on the cavity shell, a plurality of keys are arranged on the keyboard plate, the waterproof projector can be operated through the keys, and a fifth sealing structure is arranged between the keyboard plate and the cavity shell.

Preferably, a lens of the main body structure extends out of the cavity shell, a lens seal housing is arranged on the outer side of the lens, the lens seal housing is connected with the cavity shell, and a sixth sealing structure is arranged between the lens seal housing and the cavity shell.

Preferably, the waterproof projector further comprises a support, and the support is connected with the cavity shell.

Preferably, the upper cover, the upper housing, the cavity shell and the lower cover are all made of die-casting aluminum materials.

Preferably, the heat dissipation pipe is a copper pipe.

Compared with the prior art, the present disclosure has the following technical effects.

The external structure and internal components of the waterproof projector are both designed to be waterproof structures. Compared with a traditional outdoor projector, the waterproof projector has internal and external dual waterproof functions, the waterproof performance is higher, the size is small, the outdoor installation limitation is smaller, and the outdoor projector is suitable for most outdoor projection scenes, so that leakage of rainwater is effectively prevented through the internal sealed structure. The problem that the outdoor projector is insufficient in waterproof capacity is effectively solved, normal work in an outdoor rainwater environment can be achieved, and the outdoor projector is stable in work performance, small in limitation by the environment, and very convenient in installation.

BRIEF DESCRIPTION OF THE DRAWINGS

To more clearly illustrate the embodiment of the present disclosure or the technical scheme in the prior art, the following briefly introduces the attached figures to be used in the embodiment. Apparently, the attached figures in the following description show merely some embodiments of the present disclosure, and those skilled in the art may still derive other drawings from these attached figures without creative efforts.

Reference signs: 100, waterproof projector; 1, upper cover; 2, upper housing; 3, cavity shell; 4, lower cover; 5, first sealing structure; 6, second sealing structure; 7, main body structure; 8, access shell; 9, third sealing structure; 10, heat dissipation structure; 11, heat dissipation pipe; 12, heat dissipation hole; 13, fan; 14, water pump; 15, heat dissipation fan; 16, quick-release connector; 17, fourth sealing structure; 18, keyboard plate; 19, fifth sealing structure; 20, lens; 21, lens seal housing; 22, sixth sealing structure; 23, support; and 24, heat conduction structure.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

The present disclosure aims to provide a waterproof projector so as to solve the waterproof problem of the outdoor projector and greatly improve the working performance of the projector.

To make the foregoing objective, features and advantages of the present disclosure clearer and more comprehensible, the present disclosure is further described in detail below with reference to the attached figures and specific embodiments.

Figure 1:
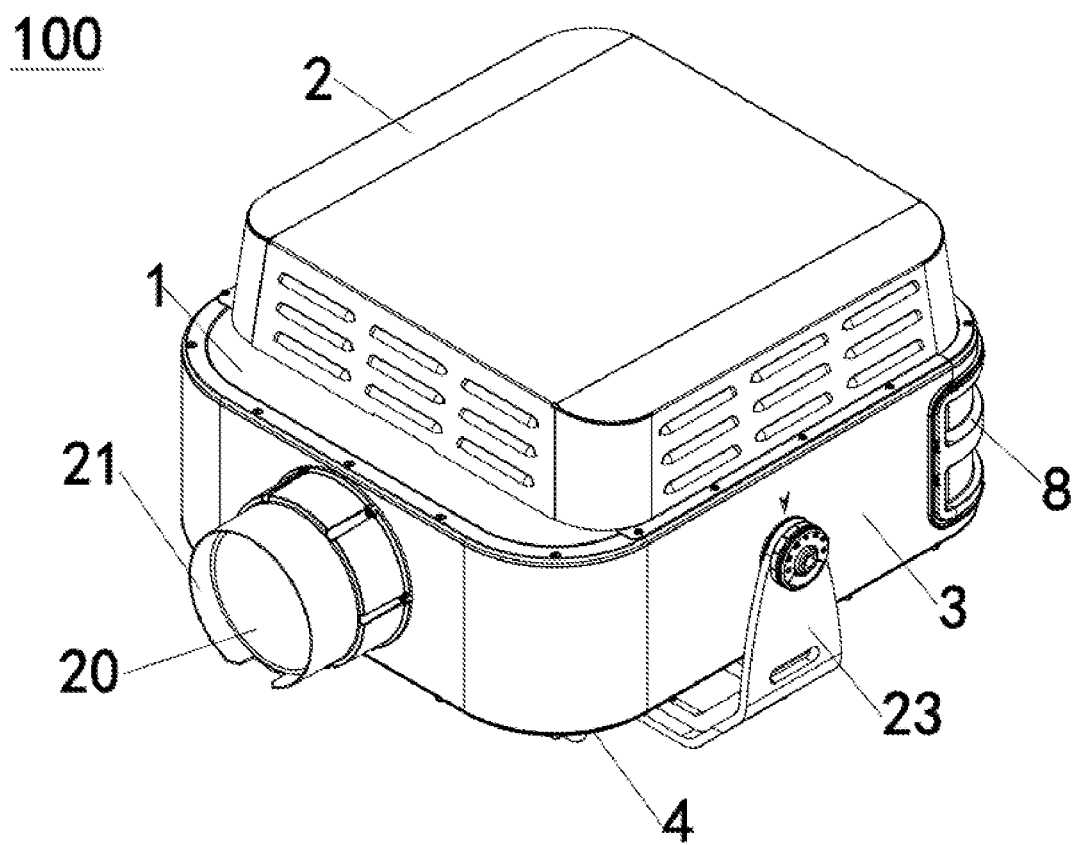
FIG. 1 is an external schematic diagram of a waterproof projector in the present disclosure.
Figure 2:
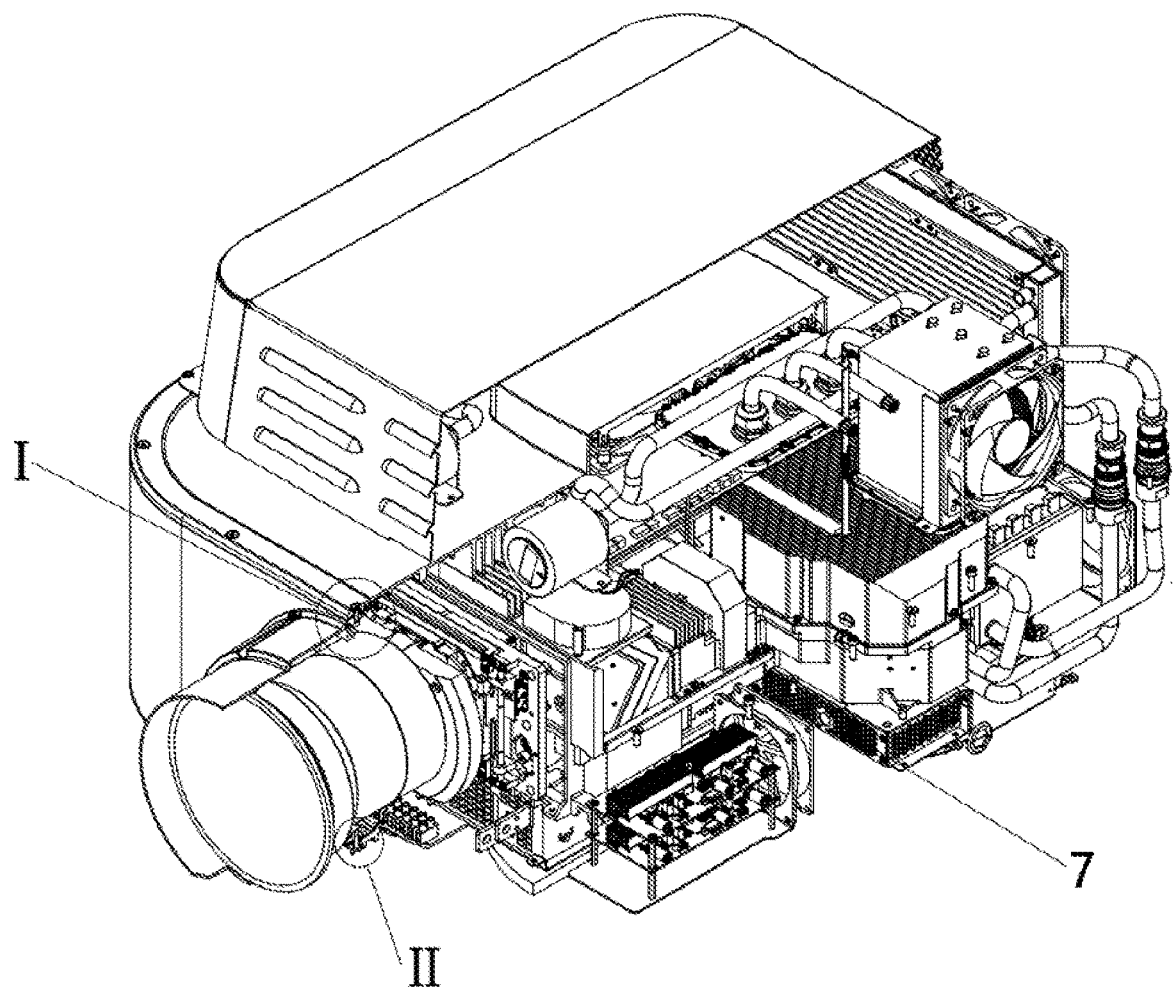
FIG. 2 is an internal schematic diagram I (front view) of a waterproof projector in the present disclosure.
Figure 3:
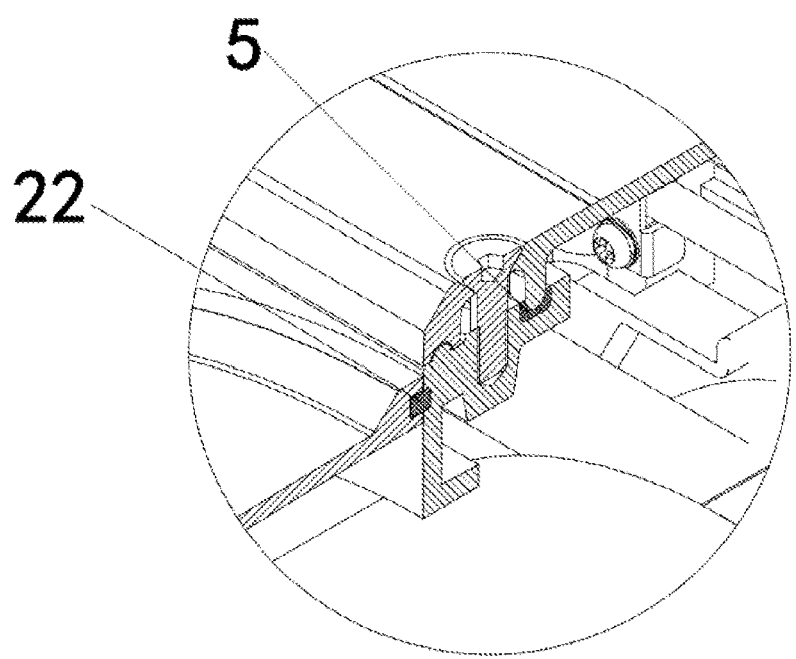
FIG. 3 is an enlarged drawing at the position of I in FIG. 2.
Figure 4:
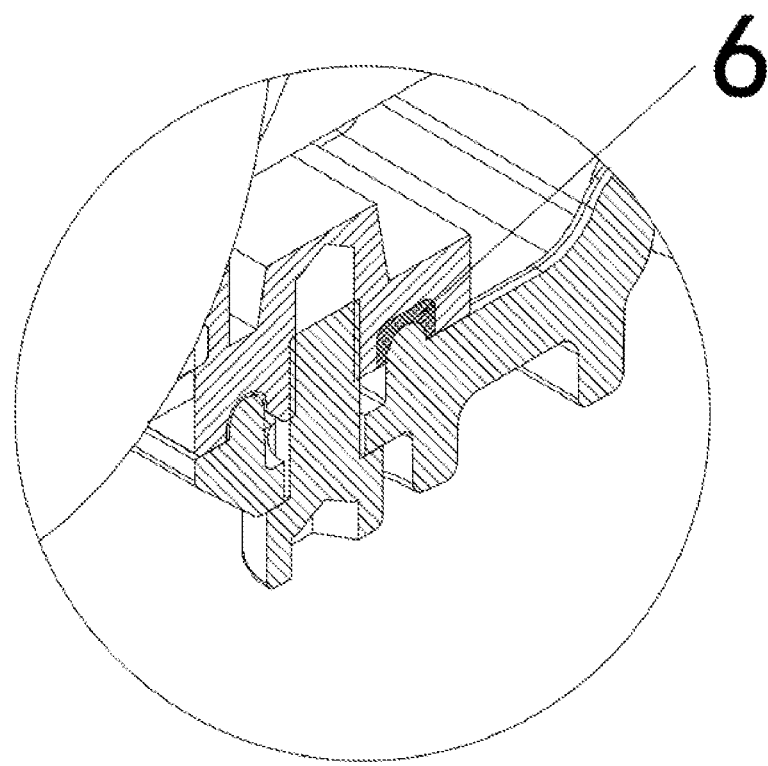
FIG. 4 is an enlarged drawing at the position of II in FIG. 2.
Figure 5:
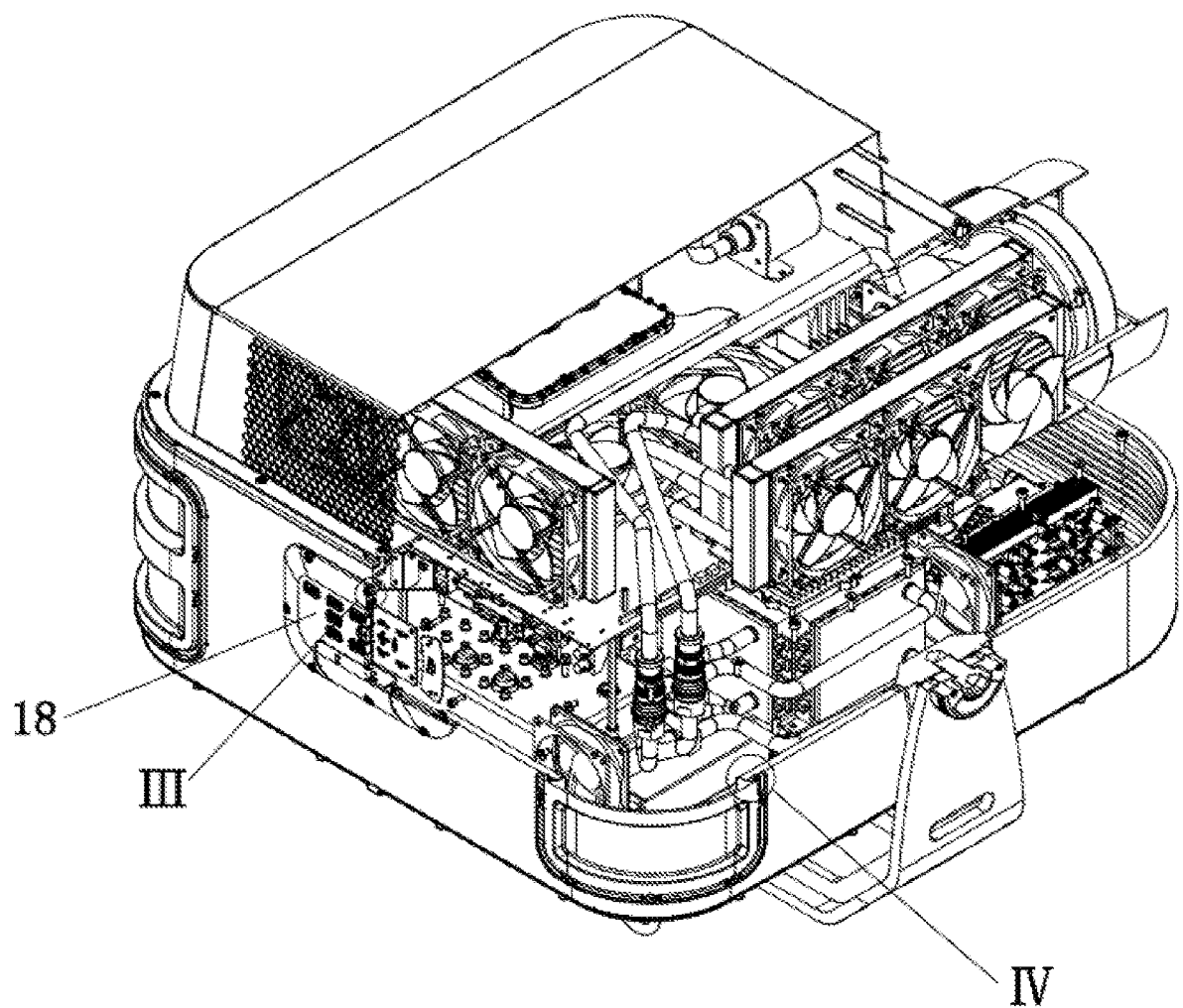
FIG. 5 is an internal schematic diagram II (back view) of a waterproof projector in the present disclosure.
Figure 6:
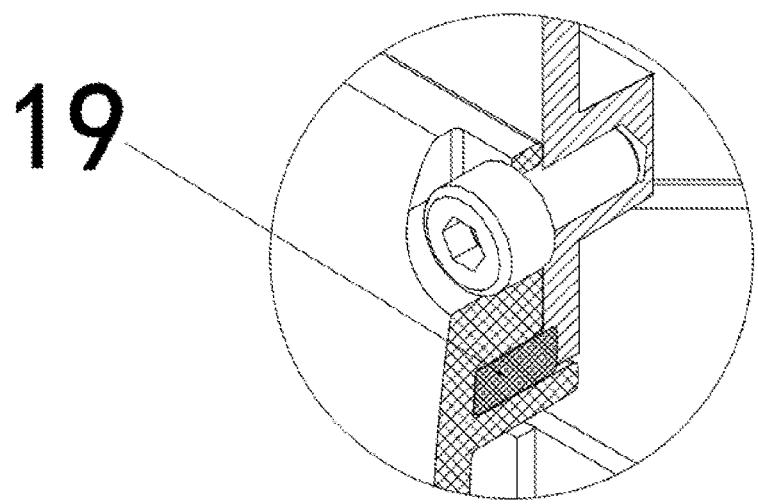
FIG. 6 is an enlarged drawing at the position of III in FIG. 5.
Figure 7:
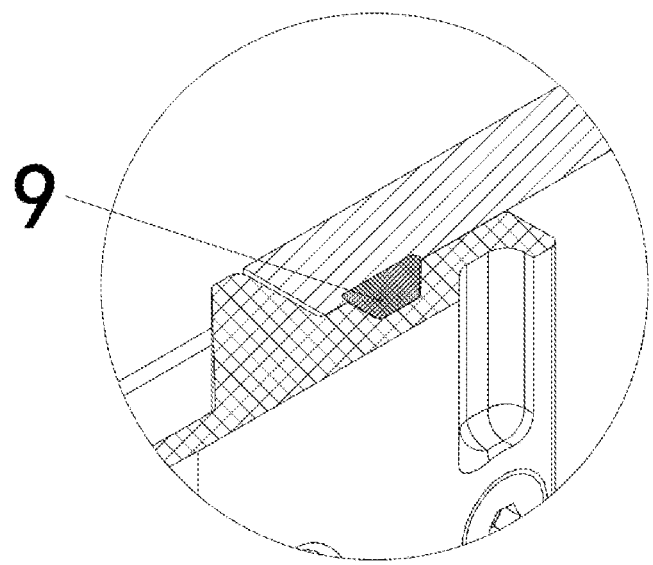
FIG. 7 is an enlarged drawing at the position of IV in FIG. 5.
Figure 8:
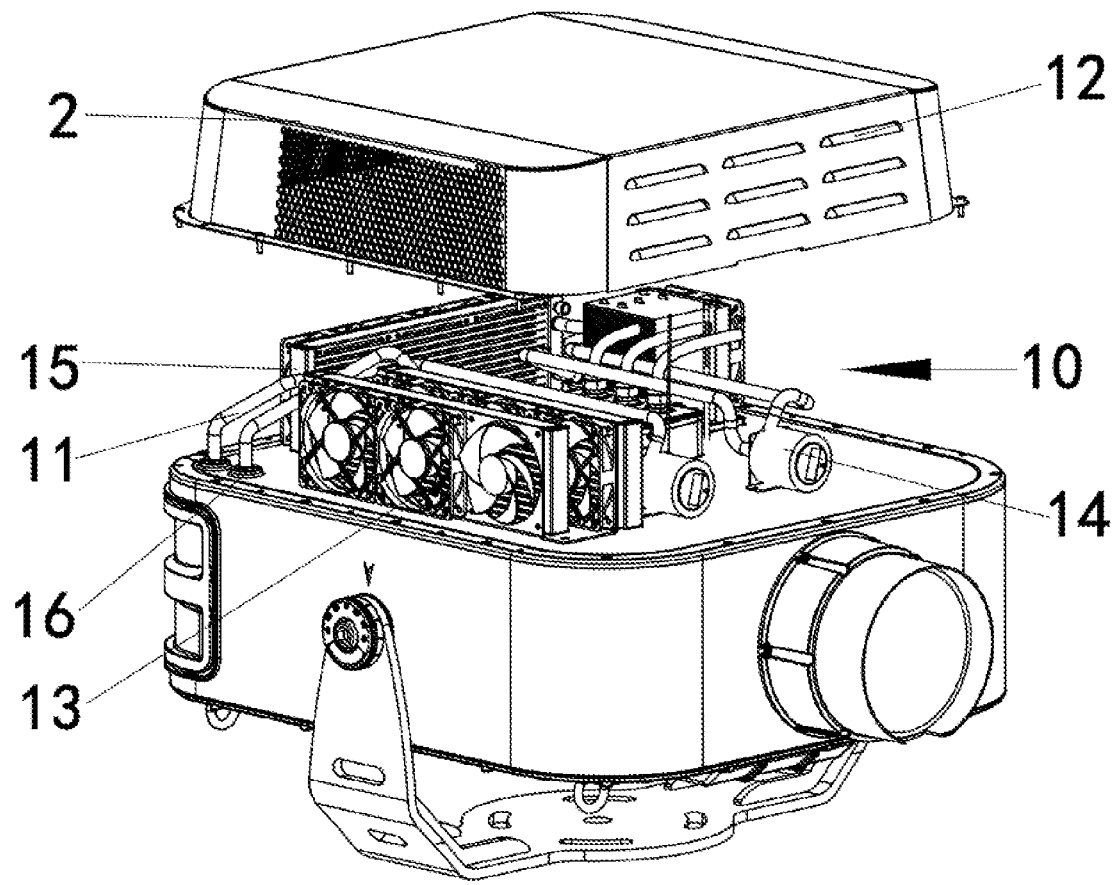
FIG. 8 is a schematic diagram of a heat dissipation structure of a waterproof projector in the present disclosure.
Figure 9:
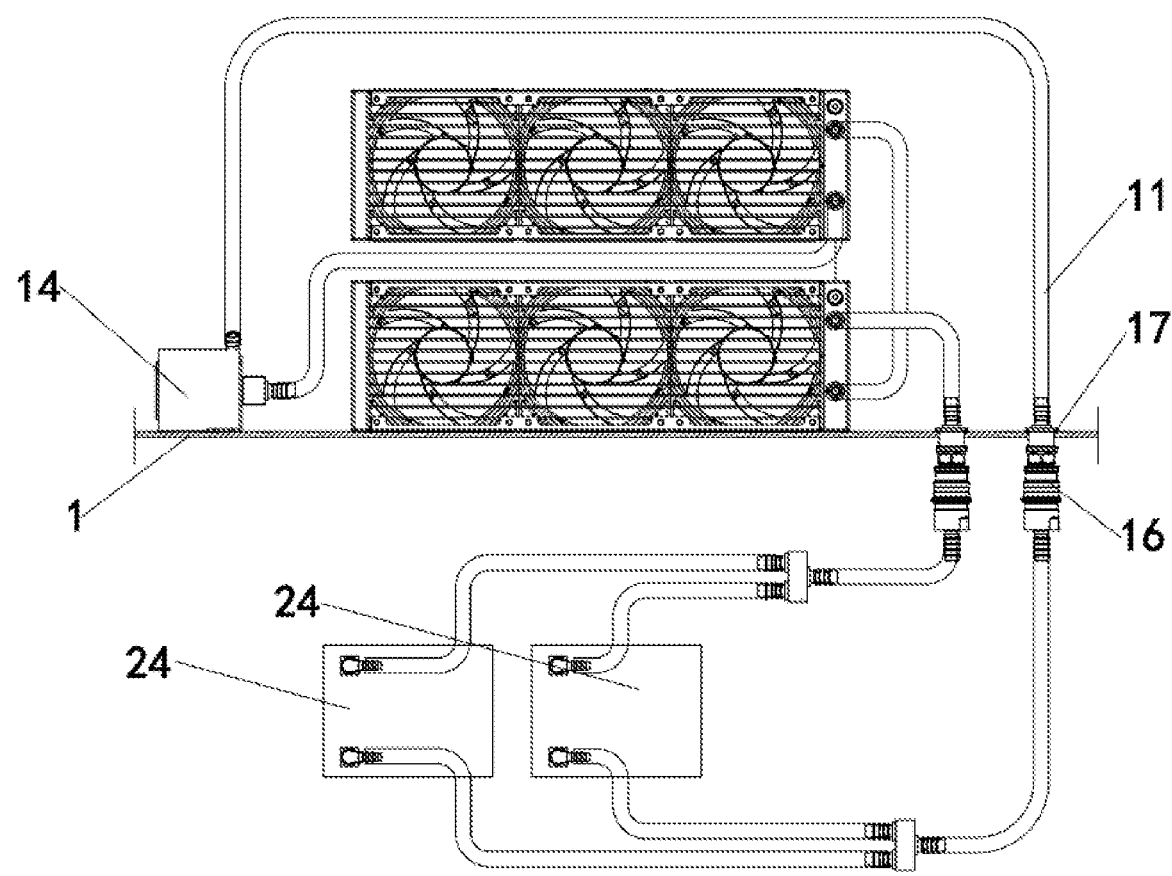
FIG. 9 is a working schematic diagram of a heat dissipation structure in the present disclosure.

As shown in FIG. 1 to FIG. 9, the embodiment provides a waterproof projector 100. The waterproof projector 100 comprises an upper cover 1, an upper housing 2, a cavity shell 3 and a lower cover 4, wherein the upper cover 1 is arranged at the upper end of the cavity shell 3, a first sealing structure 5 is arranged between the upper cover 1 and the upper end of the cavity shell 3, the lower cover 4 is arranged at the lower end of the cavity shell 3, a second sealing structure 6 is arranged between the lower cover 4 and the lower end of the cavity shell 3, a main body structure 7 is arranged in the cavity shell 3, an access hole is formed in the cavity shell 3, an access shell 8 is arranged at the access hole, a third sealing structure 9 is arranged between the access shell 8 and the cavity shell 3, when the access hole is not used, the third sealing structure 9 can play a role in waterproof protection, a heat dissipation structure 10 is arranged on the upper cover 1, the upper housing 2 is arranged on the outer side of the heat dissipation structure 10 and connected with the upper cover 1, and heat dissipation pipes 11 of the heat dissipation structure 10 penetrate through the upper cover 1 and extend into the cavity shell 3 to dissipate heat of the main body structure 7.

In the embodiment, the upper housing 2 comprises a top wall and a side wall, a plurality of heat dissipation holes 12 are formed in the side wall, the upper end of the side wall is connected with the top wall, the lower end of the side wall is connected with the upper cover 1, and the size of the upper end of the side wall is smaller than that of the lower end of the side wall. Namely, the side wall is obliquely arranged and has a certain taper.

In the embodiment, the heat dissipation structure 10 further comprises fans 13, water pumps 14 and heat dissipation fins 15, the heat dissipation pipe 11 is filled with a cooling medium, the heat dissipation pipe 11 is a copper pipe, the water pumps 14 are arranged on the heat dissipation pipes 11, the fans 13 are arranged towards the heat dissipation fins 15, the heat dissipation pipes 11 penetrate through the heat dissipation fins 15 and the heat conduction structures 24 of the main body structure 7, the heat dissipation pipes 11 transfer heat of the heat conduction structures 24 to the heat dissipation fins 15, and the fans 13 blow air to the heat dissipation fins 15 for heat dissipation of the heat dissipation fins 15. In the embodiment, the cooling medium is cooling water. The cooling water is pumped to the heat conduction structures 24 through the water pumps 14. The cooling water is evaporated into gas through the high temperature of the heat conduction structures 24, and the gas rises to the heat dissipation fins 15 along the heat dissipation pipes 11. The heat dissipation fins 15 exchange heat with the gas, the gas is cooled into cooling water, and the cooling water continues to flow back to the heat conduction structure 24s, so that circulating cooling is achieved. The heated heat dissipation fins 15 are used for heat dissipation and cooling under the action of the fans 13.

In the embodiment, the fan 13 is a waterproof fan, and the waterproof grade is as high as IP68.

In the embodiment, the upper cover 1 is provided with quick-release connectors 16, the heat dissipation pipe 11 is connected with the quick-release connector 16, and a fourth sealing structure 17 is arranged between the upper cover and the quick-release connector 16 to guarantee sealed connection between the quick-release connector 16 and the upper cover 1.

In the embodiment, a keyboard plate 18 is arranged on the cavity shell 3, a plurality of keys are arranged on the keyboard plate 18, the waterproof projector 100 can be operated through the keys, and a fifth sealing structure 19 is arranged between the keyboard plate 18 and the cavity shell 3. The fifth sealing structure 19 is used for effectively protecting the keyboard plate 18, and meanwhile, rainwater can be prevented from permeating through the keyboard plate 18, so that the safety of key operation is ensured.

In the embodiment, a lens 20 of the main body structure 7 extends out of the cavity shell 3, a lens seal housing 21 is arranged on the outer side of the lens 20 to reduce the expose of the lens 20, the lens seal housing 21 is connected with the cavity shell 3, and a sixth sealing structure 22 is arranged between the lens seal housing 21 and the cavity shell 3, so that the sealed connection between the lens seal housing 21 and the cavity shell 3 is guaranteed.

In the embodiment, the waterproof projector 100 further comprises a support 23, and the support 23 is connected with the cavity shell 3. The support 23 is a U-shaped support and plays a role in fixing and angle adjustment. Meanwhile, the height of the projector is increased, and the lower cover 4 is prevented from being in direct contact with the ground, so that the external waterproof performance of the projector is improved.

In the embodiment, the upper cover 1, the upper housing 2, the cavity shell 3 and the lower cover 4 are all made of die-casting aluminum materials for quickening heat dissipation.

In the embodiment, the main body structure 7 is the same as the structure of an existing projector. Namely, the internal structure of the projector in the present embodiment is the same as the structure of the existing projector.

In the embodiment, the first sealing structure 5, the second sealing structure 6, the third sealing structure 9, the fourth sealing structure 17, the fifth sealing structure 19 and the sixth sealing structure 22 are all sealing rings, so that the waterproof grades of the upper housing 2, the upper cover 1, the lens 20, the lower cover 4, the cavity shell 3, the keyboard plate 18, the access hole and the heat dissipation pipe 11 are all IP67.

In the embodiment, waterproof structures are arranged outside and inside the waterproof projector 100, and a complete waterproof system is formed, so that the waterproof capacity of the projector is effectively improved. The internal and external dual waterproof design is beneficial for the projector to realize stable waterproofness to deal with the humid environment during outdoor use, so that the service life of the projector is fully prolonged. Meanwhile, in the embodiment, the waterproof projector 100 is simple in structure, small in size, capable of being suitable for a plurality of outdoor projection scenes such as streets, parks and buildings, suitable for various severe weather environments, convenient to install and suitable for the global market.

Specific examples are used for illustration of the principles and implementation methods of the present disclosure. The description of the above-mentioned embodiments is used to help illustrate the method and the core principles of the present disclosure; and meanwhile, those skilled in the art can make various modifications in terms of specific embodiments and scope of application in accordance with the teachings of the present disclosure. In conclusion, the content of this specification shall not be construed as a limitation to the present disclosure.

What is claimed is:

1. A waterproof projector, comprising an upper cover, an upper housing, a cavity shell and a lower cover, wherein
    the upper cover is arranged at the upper end of the cavity shell, a first sealing structure is arranged between the upper cover and the upper end of the cavity shell, the lower cover is arranged at the lower end of the cavity shell, a second sealing structure is arranged between the lower cover and the lower end of the cavity shell, the upper cover, the cavity shell, and the lower cover together form a first chamber, and a main body structure is arranged within the first chamber,
    the upper housing is arranged on an outer side of a heat dissipation structure and connected with the upper cover, the upper cover and the upper housing together form a second chamber, and the heat dissipation structure is arranged on the upper cover and within the second chamber,
    an access hole is formed at a corner region of a side wall of the cavity shell, an access shell is arranged at the access hole, a third sealing structure is arranged between the access shell and the cavity shell,
    the upper cover is provided with quick connect fittings near the corner region, and a fourth sealing structure is arranged between the upper cover and each of the quick connect fittings,
    heat dissipation pipes of the heat dissipation structure penetrate through the quick connect fittings and extend into the cavity shell to dissipate heat of the main body structure, and
    the upper housing comprises the side wall, a plurality of heat dissipation holes are formed in the side wall;
    wherein a keyboard plate is arranged on the cavity shell, a plurality of keys are arranged on the keyboard plate, the waterproof projector can be operated through the keys, and a fifth sealing structure is arranged between the keyboard plate and the cavity shell; and
    wherein a lens of the main body structure extends out of the cavity shell, a lens seal housing is arranged on the outer side of the lens, the lens seal housing is connected with the cavity shell, and a sixth sealing structure is arranged between the lens seal housing and the cavity shell.

2. The waterproof projector according to claim 1, wherein the upper housing further comprises a top wall, the upper end of the side wall is connected with the top wall, the lower end of the side wall is connected with the upper cover, and the size of the upper end of the side wall is smaller than that of the lower end of the side wall.

3. The waterproof projector according to claim 1, wherein the heat dissipation structure further comprises fans, water pumps and heat dissipation fins, the heat dissipation pipe is filled with a cooling medium, the water pumps are arranged on the heat dissipation pipes, the fans are arranged towards the heat dissipation fins, the heat dissipation pipes penetrate through the heat dissipation fins and the heat conduction structures of the main body structure, the heat dissipation pipes transfer heat of the heat conduction structures to the heat dissipation fins, and the fans blow air to the heat dissipation fins for heat dissipation of the heat dissipation fins.

4. The waterproof projector according to claim 3, wherein the fans are waterproof fans.

5. The waterproof projector according to claim 1, wherein the waterproof projector further comprises a support, and the support is connected with the cavity shell.

6. The waterproof projector according to claim 1, wherein the upper cover, the upper housing, the cavity shell and the lower cover are all made of die-casting aluminum materials.

7. The waterproof projector according to claim 1, wherein the heat dissipation pipe is a copper pipe.

8. The waterproof projector according to claim 3, wherein the cooling medium is cooling water, the cooling water is pumped to the heat conduction structures through the water pumps, the cooling water is evaporated into gas through temperature of the heat conduction structures, the gas rises to the heat dissipation fins along the heat dissipation pipes, and the heat dissipation fins exchange heat with the gas, such that the gas is cooled into the cooling water, and the cooling water continues to flow back to the heat conduction structure.

* * * * *